United States Patent [19]

Derc

[11] 4,121,265
[45] Oct. 17, 1978

[54] TEMPERATURE COMPENSATION FOR DATA STORAGE APPARATUS

[75] Inventor: Roman Derc, Bracknell, England

[73] Assignee: Data Recording Instrument Co., Ltd., Staines, England

[21] Appl. No.: 762,744

[22] Filed: Jan. 26, 1977

[30] Foreign Application Priority Data

Feb. 6, 1976 [GB] United Kingdom ................. 4686/76

[51] Int. Cl.$^2$ .............................................. G11B 5/56
[52] U.S. Cl. ..................... 360/78; 318/634; 360/109
[58] Field of Search ..................... 360/77, 78, 109, 99; 318/634

[56] References Cited

U.S. PATENT DOCUMENTS

| | | |
|---|---|---|
| 3,531,789 | 9/1970 | Halfhill et al. .......................... 360/77 |
| 3,753,254 | 8/1973 | Ruble et al. ............................ 360/77 |
| 3,757,189 | 9/1973 | Buchan .................................. 318/634 |
| 3,900,782 | 8/1975 | Hammerschmitt .................. 318/634 |

*Primary Examiner*—John H. Wolff
*Attorney, Agent, or Firm*—Hane, Roberts, Spiecens & Cohen

[57] ABSTRACT

The positioning of the head positioning mechanism of a magnetic disc file is controlled by a servo system arrangement which involves separately monitoring the temperature conditions in the vicinity of the center track of a disc file and the head positioning mechanism; producing related electrical signals which are used in conjunction with signals defining the address of a required track of a disc and a reference voltage to obtain a temperture corrected signal which is used to produce a head positioning control signal.

5 Claims, 2 Drawing Figures

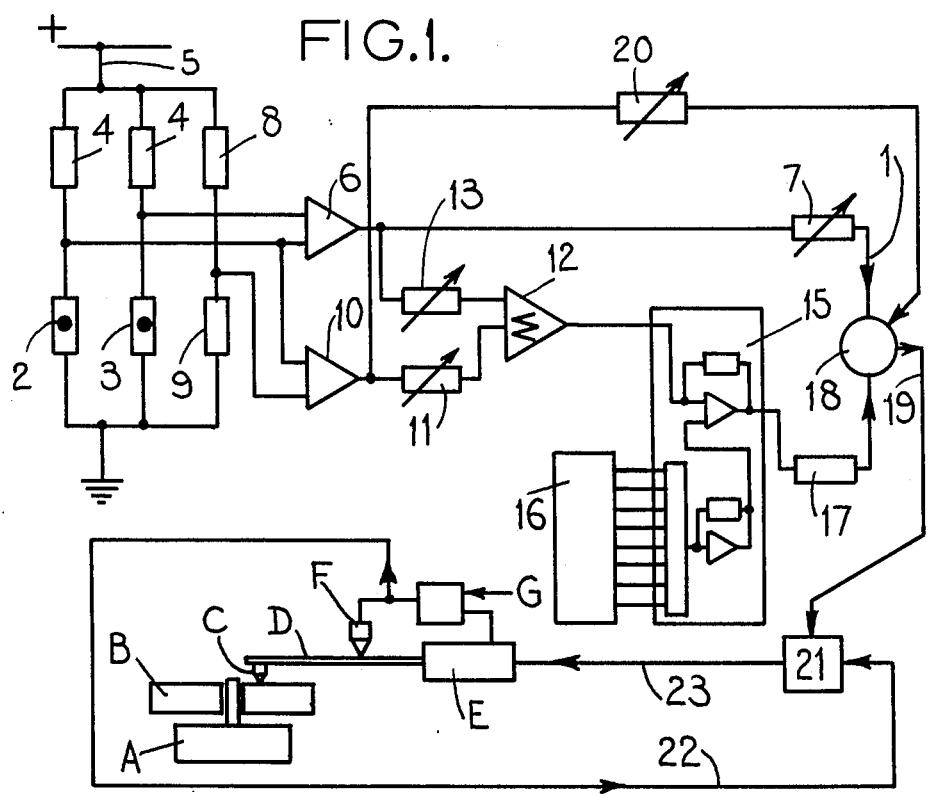
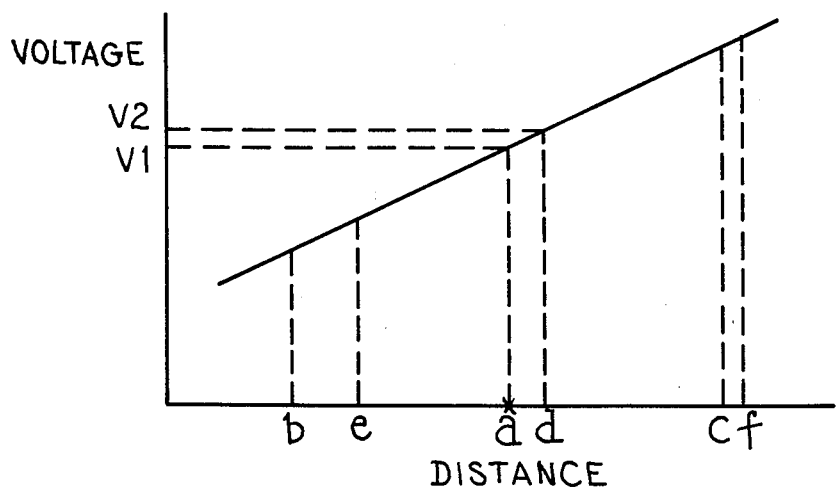

TEMPERATURE COMPENSATION FOR DATA STORAGE APPARATUS

BACKGROUND OF THE INVENTION

1. Field of the Invention

This invention relates to temperature compensation arrangements for magnetic disc files.

2. Description of the Prior Art

The majority of disc file systems which are used for data storage, select a desired track on a disc by moving a magnetic head to the appropriate position under the control of a servo mechanism. The residual errors in the track selection mechanism become important as the spacing between the tracks is reduced in order to increase the data packing density. One source of such errors is changing temperature.

SUMMARY OF THE INVENTION

According to the invention apparatus for generating a servo control signal for the head positioning mechanism of a disc file includes means for generating a first signal, which is effective to control movement of the head to the center track of a set of tracks on a disc irrespective of temperature; means for generating a correction signal which is dependent upon temperature; means for generating a third signal which represents the address of a desired track; means for combining the correction signal and the third signal to generate a fourth signal which represents the difference between the desired address and the center track address corrected for temperature; and means for combining the first and fourth signals to form a servo control signal.

DESCRIPTION OF THE DRAWINGS

In one embodiment of the invention the correction signal is dependent upon the overall temperature of the disc file and upon the temperature of the disc.

The invention will now be described, by way of example, with reference to the accompanying drawing, in which:

FIG. 1 is a schematic diagram of apparatus for generating a servo control signal; and FIG. 2 is an illustration of temperature correction.

DESCRIPTION OF THE PREFERRED EMBODIMENT

The invention will be described as applied to a disc file of conventional design. The file has a motor driven disc spindle unit A on which may be mounted a disc pack B which contains one or more storage discs. The faces of the discs carry sets of circular magnetic recording tracks. The tracks of a set are spaced at different radial distances from the center of the disc.

A group of transducer heads C, one per disc surface, are movable radially of the discs to position the heads over any desired track of each of the sets of tracks. In the Figure only one head is shown. The heads are mounted on a carriage D which is driven by a linear motor E. The movement of the carriage is monitored by a position transducer F. This may consist of a pair of linear coils which move relative to each other and generate signals which can be counted. This provides an indication of the head position which is compared with the desired track address to generate by means of a servo mechanism G a servo drive signal for the linear motor E.

Let it be assumed that the file has been in operation for some time, so that all the parts have attained a substantially steady and uniform temperature. The various parts are made of different materials. For example, the position transducer may have copper coils on a glass base, the discs may be of aluminium, the head supports of phosphor bronze, and so on. In general, these materials will have different coefficients of expansion, so that the relative positions of the various parts will be dependent on the temperature. Consequently, if a track were written on a disc at one temperature and that track was selected for reading at a time when the temperature was different, the servo mechanism would not be able to position the head accurately on the track.

The effective cost of the disc file is greatly increased if it can only be operated at a fixed temperature. Either the disc file must be provided with its own temperature control system, or it must be operated in a temperature controlled environment. In addition, there is the difficulty that the system cannot be operated during the start-up period before the standard temperature has been achieved.

There is a futher problem in practice, because it may be necessary to change the disc pack during operation in order to load new data into the system. the disc pack is likely to be at a different temperature from the rest of the disc file, normally at a substantially lower temperature. This will produce an additional error in the servo system. The effect of these errors may be sufficient with a high track density to cause the head to read an incorrect track.

The apparatus of the present invention provides for temperature correction to be applied about the central track of the set of tracks of a disc of the disc file. Compensation for the instantaneous position of the central track is provided through signal level setting devices 7 and 20. The servo control signal for the motor E is dependent on voltages developed by two thermistors 2 and 3. The thermistor 2 is mounted in such a position that it responds to the temperature of the disc file in the region of the head positioning-mechanism. The thermistor 3 is mounted to respond to the temperature of the disc pack. Each thermistor 2 and 3 is connected in series with a resistor 4 between a stabilised power line 5 and ground. Since the resistance of each thermistor depends upon its temperature, the voltage at the junction of the thermistors 2 and 3 and the associated resistors 4 also varies with temperature. The voltages at these two junctions are respectively connected to the two inputs of a differential amplifier 6. The output of the amplifier is fed to a signal line 1 through the signal level setting device 7 which is indicated as a variable resistor. The device 7 allows the signal on the line 1 to be adjusted to the required value under standard conditions. The line 1 is connected to a first input of a signal mixing or summing device 18.

A reference voltage is generated at the junction of two resistors 8 and 9 serially connected between ground and the power line 5 and this reference voltage is fed to one input of an amplifier 10. The other input to the amplifier 10 is taken from the thermistor 2. The output of the amplifier 10 is fed through a voltage level adjusting device 11 to an input of a summing amplifier 12. The output of the amplifier 10 is also fed through the level setting device 20 to a second input of the mixing, or summing, device 18. The output of the amplifier 6 is also connected to another input of the summing amplifier 12 through a level adjusting device 13. The output of the amplifier 12 is fed to a conventional digital to analogue signal converter multiplier unit 15 which also receives the output from an address register 16 which holds the address of a desired track. The output of the multiplier 15 is fed through a resistor 17 to the signal mixing or summing device 18. The device 18 provides a resultant output signal on line 19. The line 19 is connected to a comparator 21 which also receives on a line 22 a signal representing the head position and generates an output on a line 23 to control the energisation of the linear motor E which positions the heads C.

The amplifier 10 produces a signal which represents the actual temperature of the disc system and amplifier 6 produces a signal proportional to the difference between the temperature of the disc system and that of the disc pack. The proportions of the two error factors can be adjusted by signal level setting devices 11 and 13, so that the output from the multiplier 15 is a close match to the required value for all tracks over a substantial temperature range. This voltage is combined with the center track voltage in the mixer 18, so that the signal on the line 19 is a corrected value which will drive the head C to the required position.

As has been mentioned the thermistor 2 is mounted in such a position that it responds to the temperature of the disc file in the region of the head positioning-mechanism. The thermistor 3 is mounted to respond to the temperature of the disc pack. Consequently, the output of the amplifier 6 accordingly represents the temperature differential between the disc pack B and the rest of the disc system.

If one assumes that the disc system (i.e. the heads etc.) is at a standard temperature, and that the disc pack is at a lower temperature, then the center track will be closer to the spindle than for equal temperatures. Accordingly, the head positioning mechanism E, D will have to move the head C further than for standard temperature. This is shown in exaggerated form in FIG. 2, where $a$, $b$, and $c$ represent the distances to be moved to reach the center, outer and inner tracks, respectively, of a set at standard temperature. The corresponding distances are shown as $d$, $e$ and $f$ for a cold disc pack B. The distance '$a$' may be regarded as corresponding to a voltage V1, which is the analogue equivalent of the address of the central track. This changes to V2 for a cold pack. Thus, the temperature differential has produced a voltage error equal to V2-V1 on the central track. Thus, if the characteristics of the amplifier 6 and the level setting device 7 are such that the output voltage increased from V1 to V2 on the postulated temperature differential, then the head C will be positioned correctly.

It will be seen that the error voltage is a function of the position of the track, that is, of the track address. Correction of this is effected by the multiplier 15. A convenient form of this device includes a conventional digital to analogue converter, which generates the analogue equivalent of the address in the register 16. The amplitude of the resulting analogue signal is set by the address and by the amplitude of the output from the summing amplifier 12, which acts as a reference voltage. The arrangement is balanced so that the output for the center track address is zero.

The embodiment has been described in a form which is primarily analogue. It will be understood that many alternative forms are possible. For example, the generation of the control signal may be carried out partly, or wholly, by digital methods.

The described embodiment has been found to operate satisfactorily in practice. However, it will be understood that one or more further thermistors may be used to provide a more precise sensing of the temperature differentials. Their outputs are combined in a manner similar to that already described. The invention may, of course, use other forms of temperature sensing device which provide an electrical output which is representative of the temperature.

I claim:

1. In a disc drive system of the type having a movable head positioning mechanism which is servoed to position a head to a desired track of a disc pack located in an environment in which the disc file in the region of the head mechanism is likely to have a temperature which is different from that of the discs, which comprises
    (a) means for generating a first voltage proportional to the difference between the temperature of the disc file in the region of the head mechanism and the disc pack;
    (b) means for separately generating a second voltage proportional to the difference between the voltage related to the temperature of the disc file in the region of the head mechanism and a reference voltage;
    (c) means for comparing a signal proportional to the first and second voltages with a further signal proportional to the address of the track to which the head is to be positioned thereby to produce an additional voltage which is compared with the first and second voltages to provide a head position correcting signal; and
    (d) means for comparing the correcting signal with an instantaneous head position signal to provide a drive control signal for positioning the head to the desired track irrespective of overall temperature variations or differences in said temperatures.

2. Apparatus as claimed in claim 1, wherein the means for generating the first voltage includes a first differential amplifier connected to receive signals representative of said temperatures, and first signal level setting means connected to receive the amplifier output to enable adjustment of the output of the differential amplifier at standard conditions.

3. Apparatus as claimed in claim 2, wherein the means for generating the second voltage includes a second differential amplifier connected to receive the signal representative of the temperature of the disc file in the vicinity of the head mechanism and the reference voltage, and second signal level setting means connected to receive the amplifier output to enable adjustment of the output of the second amplifier to a required signal level.

4. Apparatus as claimed in claim 3, and including a signal summing or mixing means for combining the first and second voltages, and the additional voltage.

5. In a disc drive system of the type having a movable head positioning mechanism which is servoed to position a head to a desired track of a disc pack located in an environment in which the disc file in the region of the head mechanism is likely to have a temperature which is different from that of the disc pack, which comprises
    (a) means for generating a first voltage proportional to the difference between signals representative of the temperature of the disc file in the region of the head mechanism and the disc pack;
    (b) means for generating a second voltage proportional to the difference between the signal representative of the temperature of the disc file in the region of the head mechanism, and a reference voltage;

(c) means for comparing the first and second voltages to produce a further signal for comparison with a address signal characteristic of an address of the desired track to produce an additional signal;

(d) means for comparing the additional signal with the first and second voltages to produce a correction signal for comparison with a signal representative of the instantaneous position of the head mechanism to provide a drive control signal for positioning the head mechanism to the desired track irrespective of any temperature variation between the head mechanism and the disc pack.

* * * * *